UNITED STATES PATENT OFFICE.

GEORGE J. CLINE, OF GOSHEN, INDIANA.

PAINT FOR ROOFING, &c.

SPECIFICATION forming part of Letters Patent No. 253,978, dated February 21, 1882.

Application filed November 19, 1881. (No specimens.)

*To all whom it may concern:*

Be it known that I, GEORGE J. CLINE, a citizen of the United States, resident at Goshen, in the county of Elkhart and State of Indiana, have invented a new and valuable Improvement in Paints for Roofs, &c.; and I do hereby declare that the following is a full, clear, and exact description of the same.

This invention has relation to water-proof paints for walls, roofing, and other exposed surfaces; and it consists in the paint compounded of coal-tar, silicate of soda, alkali, and water-lime, with the addition of a small quantity of asphaltum, as hereinafter set forth.

The paint is composed of the following ingredients in the proportions stated: coal-tar, sixty per cent.; silicate of soda, fifteen per cent.; potash or other alkali, two per cent.; hydraulic lime, sixteen per cent.; asphaltum, seven per cent.

A little variation in these proportions will not affect the quality of the paint. It can be made thicker by adding more water-lime or hydraulic lime.

In preparing the paint the coal-tar is heated and then the silicate of soda and alkali are added. When these are dissolved the water-lime and asphaltum are added. The thickness of the paint depends mainly on the proportion of water-lime employed.

This composition forms a neat black paint having, when dry, a fine polished or glossy surface.

Having described this invention, what I claim, and desire to secure by Letters Patent, is—

The water-proof paint herein described, consisting of coal-tar, silicate of soda, alkali, and water-lime, with asphaltum, compounded in the proportions and manner set forth.

In testimony that I claim the above I have hereunto subscribed my name in the presence of two witnesses.

GEORGE J. CLINE.

Witnesses:
    JO. H. DEFREES, Jr.,
    MYRON E. MEADER.